May 25, 1937.  D. E. WEBSTER  2,081,843
GRINDING WHEEL AND METHOD OF MAKING THE SAME
Filed Dec. 14, 1935

INVENTOR
DUANE E. WEBSTER
BY
ATTORNEY

Patented May 25, 1937

2,081,843

UNITED STATES PATENT OFFICE 2,081,843

GRINDING WHEEL AND METHOD OF MAKING THE SAME

Duane E. Webster, Worcester, Mass., assignor to Norton Company, Worcester, Mass., a corporation of Massachusetts Application December 14, 1935, Serial No. 54,427

2 Claims. (Cl. 51—278)

The invention relates to grinding wheels, and with regard to its more specific features, to cutting-off grinding wheels.

One object of the invention is to provide a faster cutting wheel. Another object of the invention is to provide an improved method of making a cutting-off wheel. Another object of the invention is to provide a cutting-off wheel that develops less heat and is more dependable in operation. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be pointed out in the following claims.

In the accompanying drawing in which is shown one embodiment of the invention,

Figure 3:
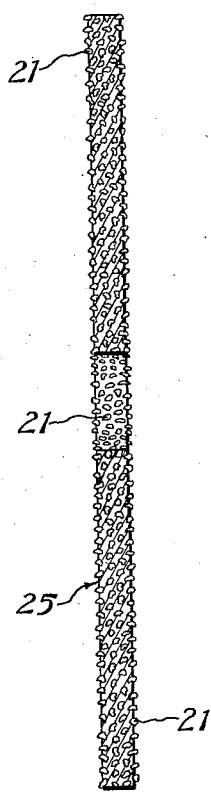
Figure 3 is a sectional view through a cutting-off grinding wheel.

I provide a suitable quantity of abrasive grain and a suitable quantity of bond. Any type or size of abrasive grain may be used. Known abrasive grain includes aluminum oxide, silicon carbide, quartz, emery, corundum, garnet, and diamond. Any of these may be used. Abrasives also include boron carbide, and other carbides, such as tantalum and tungsten. Any of these may be used. Abrasive grain of any size may be employed, but so far as certain features of the invention are concerned, the medium or large sizes are preferred, it being understood that the range of sizes depends upon the material of the grain, the size of the wheel, and the material being cut. The grain size of diamond for a carbide tool cut-off wheel will in most cases be smaller than the grain sizes for a cutting-off wheel to cut cold rolled steel bars, angles or the like.

Organic bonds may be used, and also any other bond which sets cold or at a baking as distinguished from a kiln temperature. In addition to the organic bonds I mention the various cements and sodium silicate. I prefer, however, to use an organic bond.

Organic bonds include rubber, shellac and synthetic resins typified by phenol-formaldehyde resins. A characteristic of these organic bonds as distinguished from vitrified ceramic bonds, and also cements and sodium silicate, is that the organic bonds are less brittle. They stand the shock of a blow better than the others. A cutting-off wheel is preferably as thin as possible, because grinding a wide slot is merely power and material wasting, since any slot will suffice to cut off a part. An organic bonded wheel can be made thinner than a vitrified wheel and still be satisfactory on account of its greater resistance to mechanical shock.

For the foregoing reasons organic bonded wheels have generally been used for cutting-off wheels. But as ordinarily made, organic wheels have side surfaces that embody the billiard table smoothness of the molds in which they are pressed, due to the plasticity of the bond.

I mix the grain and the bond in any suitable or known manner. I then select a mold of the size desired for the production of a given size of grinding wheel. A mold usually embodies a bottom plate 10, a top plate 11, a mold ring 12 in the internal bore of which the top and bottom plates fit with a close fit, and the mold also usually involves a central core 13 which fits in holes in the top and bottom plates and which forms the central hole in the wheel. These parts have usually been made of iron or steel and have had smooth surfaces.

I provide for the top and bottom plates of the mold a piece of soft sheet material 15 of the same area as the grinding wheel to be formed, that is to say exactly covering the top surface of the bottom plate and the bottom surface of the top plate. For this material I prefer to use blotting paper or I may use soft rubber or the like.

Assembling the mold except for the top plate 11, I place the annular disk of sheet material 15, blotting paper or the like, on the bottom plate 10. I then introduce the desired quantity of mixture 20 of abrasive grain and bond together with whatever plasticizer or temporary binder is used, if any. I level off the wheel mixture. I then place on top of the wheel mixture the second sheet of blotting paper or the like 15 which is preferably the same size and shape as the first sheet. I then insert the top plate 11 of the mold.

Figure 2:
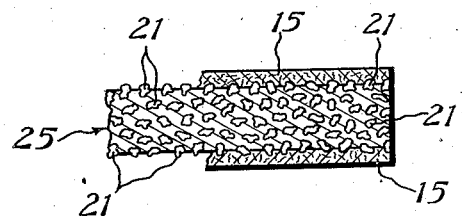
Figure 2 is an enlarged fragmentary sectional view, showing the action in the mold.
Figure 1:
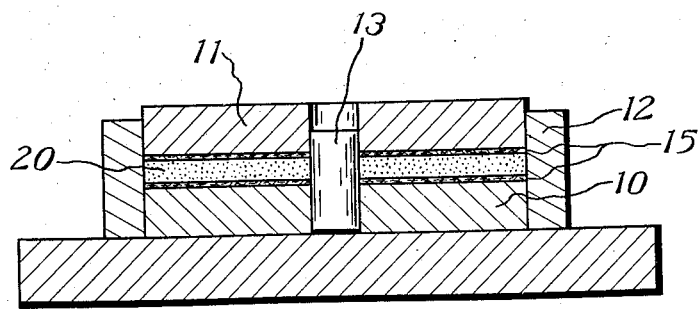
Figure 1 is an axial sectional view through a mold apparatus adapted to carry out the method of the invention.

Subsequent operations may be the same as according to previous practice. I may cold press the mixture in a press of any desired description, forcing the top and bottom plates together to the limits desired. The abrasive grain being harder than the bond will project into the soft material, viz. the blotting paper or rubber or the like, as clearly shown in Figure 2, and then the mold may be opened and the sides of the pressed or "green" wheel will show the abrasive grains 21 projecting from the mass. I may then place in a vulcanizer if it is a rubber wheel or in a heat treating oven if it is a resin bonded wheel, and vulcanize or bake at the desired temperature and for the desired length of time. The final finished product 25 is rough on the sides by roughness which is of the order of that of the abrasive grains. It represents approximately a cross section through such an abrasive body as might be made without cutting the abrasive particles.

In carrying out the invention I may use sheet material that is not entirely coterminous with the top and bottom plates if it is desired or sufficient merely to produce a roughness on part of the area of the sides of the wheel.

I may mold the wheel mixture in a hot press if desired and in such cases use a material and a temperature which do not result in destroying the material. For example, blotting paper may be used when hot pressing at around 160° C. It is found that in either case the soft material may be readily pried off the pressed wheel if it is removed from the mold, and in some cases may be lifted therefrom without prying. As the resultant wheel has a natural roughness to each side thereof, it cuts its way through a shaft or other shape without excessive heating due to side friction. There is also less tendency for the outer part to wear thin, which causes the wheel to wedge unless the side faces thereof are abradant. But in the case of the usual pressed wheel involving an organic bond the side faces have been smooth and therefore non-abradant.

Instead of placing the blotting paper or other soft material in the mold as hereinbefore specified, I may form the aforesaid natural roughness on each side of the wheel, thus producing a rough sided wheel, as follows: Using rubber bond or bond having similar characteristics, I form a mixture of the abrasive grains with the rubber in any desired manner. Several methods of doing this are now known to the art and I may use any of them. Having produced a mass of rubber and abrasive grains, I pass the same through calendering rolls for the production of a thin sheet of still soft, unvulcanized rubber and abrasive grains. Prior to the last passage through the calendering rolls, or if there be only one passage therethrough, prior to passing the mixture through the calendering rolls, I place sheets of blotting paper or the like, one on each side of the mixture. Preferably the soft material such as the blotting paper specified should be substantially coterminous with the mass of rubber and abrasive.

By reason of the calendering operation which reduces the thickness of the mass, the abrasive grains are forced into the soft material. As the material comes from the calendering rolls the blotting paper or other soft substance may be readily peeled off of it on both sides. I then die out the desired disk shapes, set the shapes on a batt, and vulcanize according to known practice. The rubber mixture will preferably include an amount of sulphur, such as 20% or more, to form a hard rubber bonded grinding wheel.

It will thus be seen that there has been provided by this invention a method and a grinding wheel in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:—

1. Method of making a grinding wheel which comprises placing in a mold a quantity of abrasive grains and a plastic organic bond, placing against the bottom plate and top plate of the mold a sheet of soft compressible substance, placing the mold in a press, pressing and indurating, whereby there is formed a wheel in which abrasive grains project outwardly from the body thereof on the side faces of the wheel.

2. A cutting-off grinding wheel comprising abrasive grains bonded with a plastic organic bond very thin in comparison with its diameter and having rough side faces with individual abrasive grains projecting from the mass of abrasive grains and from the bond which is located in valleys between the abrasive grains, said cutting-off grinding wheel being formed in a mold and pressed and indurated, and a sheet of soft compressible substance having been placed in the mold against the bottom plate and top plate thereof, the pressing having taken place while such sheets of soft compressible substance were in the mold.

DUANE E. WEBSTER.